US012585696B2

(12) United States Patent
Wu et al.

(10) Patent No.: US 12,585,696 B2
(45) Date of Patent: Mar. 24, 2026

(54) REDUCING METADATA TRANSMITTED WITH AUTOMATED ASSISTANT REQUESTS

(71) Applicant: GOOGLE LLC, Mountain View, CA (US)

(72) Inventors: Pengfei Wu, San Jose, CA (US); Xin Li, Newark, CA (US)

(73) Assignee: GOOGLE LLC, Mountain View, CA (US)

( * ) Notice: Subject to any disclaimer, the term of this patent is extended or adjusted under 35 U.S.C. 154(b) by 515 days.

(21) Appl. No.: 17/902,485

(22) Filed: Sep. 2, 2022

(65) Prior Publication Data

US 2024/0070193 A1       Feb. 29, 2024

Related U.S. Application Data

(60) Provisional application No. 63/402,299, filed on Aug. 30, 2022.

(51) Int. Cl.
| | |
|---|---|
| *G10L 15/20* | (2006.01) |
| *G06F 16/683* | (2019.01) |
| *G10L 15/22* | (2006.01) |

(52) U.S. Cl.
CPC ............ *G06F 16/683* (2019.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2015/0067270 A1 | 3/2015 | Miyajima et al. | |
| 2015/0169284 A1* | 6/2015 | Quast .................. | G06F 16/9535 |
| | | | 704/275 |

(Continued)

FOREIGN PATENT DOCUMENTS

| EP | 2575128 | 4/2013 |
|---|---|---|

OTHER PUBLICATIONS

European Patent Office; International Search Report and Written Opinion issued in Application No. PCT/US2022/050277; 15 pages; dated May 26, 2023.

(Continued)

*Primary Examiner* — Seong-Ah A Shin
(74) *Attorney, Agent, or Firm* — Gray Ice Higdon

(57) ABSTRACT

Implementations relate to maintaining metadata, of a client device, stored on a remote computing device, to reduce overall network utilization and/or latency in responding to automated assistant requests received at the client device. The metadata of a client device is identified and provided to a remote computing device with a request that requires additional processing by the remote computing device. Current metadata is compared to previously provided metadata that was provided to the remote computing device with a previous request and one or more operations are generated based on the difference between the current metadata and the previous metadata. The remote computing device executes the one or more operations on a remote version of the metadata to generate a new remote version of the metadata of the client device. The remote computing device further processes the request with the new remote version of the metadata.

20 Claims, 7 Drawing Sheets

(56)  References Cited

U.S. PATENT DOCUMENTS

| | | | |
|---|---|---|---|
| 2015/0248887 A1* | 9/2015 | Wlodkowski | G10L 15/08 |
| | | | 704/246 |
| 2019/0087205 A1* | 3/2019 | Guday | G06F 9/453 |
| 2020/0226100 A1 | 7/2020 | Li et al. | |
| 2020/0327895 A1* | 10/2020 | Gruber | G06F 16/2457 |
| 2021/0034663 A1* | 2/2021 | Aher | G06F 16/635 |
| 2021/0099567 A1 | 4/2021 | Accame et al. | |
| 2022/0180867 A1* | 6/2022 | Bobbili | G10L 15/30 |
| 2023/0092702 A1* | 3/2023 | Mao | G10L 15/20 |
| | | | 704/9 |

OTHER PUBLICATIONS

European Patent Office; Communication pursuant to Article 94(3) EPC issued in Application No. 22839037.3, pages, dated Oct. 17, 2025.

* cited by examiner

Receive a request and one or more operations          605

Identify previous metadata          610

Update the previous metadata using the one or more operations          615

Determine the action using the request and the updated metadata          620

Cause performance of the action          625

REDUCING METADATA TRANSMITTED WITH AUTOMATED ASSISTANT REQUESTS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances, such as an invocation indication followed by a spoken query. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

In some instances, an automated assistant may be executing, at least in part, on multiple devices. Client computing devices are oftentimes limited in computing capabilities and therefore may not have the resources to process requests from users. Requests can be transmitted to a remote computing device, with more computing resources than the client device, for processing in order to determine an action to perform based on the request. For some requests, additional information that is available on the client device may be provided with the request in order for the remote computing device to process the request. Thus, in addition to a request, client device metadata may be provided with the request to facilitate processing of the request by the remote computing device.

SUMMARY

Some implementations disclosed herein relate to maintaining a remote version of metadata by determining a difference between previous metadata and current metadata of a client device that is executing, at least in part, an automated assistant. Some implementations include receiving a request from a user that can be processed by an automated assistant that is executing in part on a client device and executing in part on a remote computing device. Some versions of those implementations include identifying, at the client device, locally stored previous metadata that reflects the remote version of metadata maintained on a remote device that has been previously provided by the client device to the remote computing device in response to a previous request. Some of those versions further include determining, at the client device, a difference between the previous metadata (i.e., the metadata at the time of the most previous request) and the current metadata of the client device, and providing, by the client device to the remote computing device, a set of operations to transform the remote version of the previous metadata into a remote version of the current metadata. The previous metadata can be stored by the client device so that, when a subsequent request is received, a new difference between the current metadata of the client device and the previous metadata can be determined and a set of operations that can transform the previous transmitted metadata to the current metadata can be provided with the subsequent request. Notably, the set of operations, transmitted by the client device to the remote computing device in response to a request, are of a smaller size (i.e., less bytes) than the current metadata. Nonetheless, the remote computing device can utilize the set of operations, and the remote version of metadata for the client device, to effectively recreate the current metadata at the remote computing device. In these and other manners, conservation of network resources is achieved, while still enabling the remote computing device to utilize the current metadata to determine action(s) that are responsive to the request, such as action(s) that would not be resolvable absent the metadata and/or action(s) that are more robust and/or accurate in view of the metadata.

As an example, a user may invoke an automated assistant using one or more invocation phrases, followed by a request, such as "Call Bob." The automated assistant can be executing in part on the client device and in part on a remote computing device such that at least some of the request can be handled by the remote computing device. In the instance of a request to "Call Bob," the remote automated assistant may handle the processing of the request but, in order to process the request, may require the contacts of the user (e.g., contact names and phone numbers). The first time that the user makes a request to make a phone call, the client automated assistant can provide, with the request, all of the contact information that is stored locally on the client device (i.e., the initial metadata). For example, the client automated assistant can provide an encrypted version of the contact information, which can be decrypted at the remote computing device. In response, the remote automated assistant can fulfill the request by determining, from the provided metadata (i.e., the user's contacts), a phone number for "Bob" and further process the request. Still further, the provided metadata can be stored by the remote automated assistant for use when the user submits a new request to make a phone call. Likewise, the provided metadata can be stored by the client automated assistant on the client device.

When the user submits a new request to make a phone call, such as "Call Sue," the client device automated assistant can first identify the metadata that is required by the remote automated assistant in order for the remote automated assistant to process the request. However, before sending the metadata, the client automated assistant can compare the contacts to the stored metadata that was previously provided to the remote automated assistant. If there have been no changes to the metadata (i.e., the stored metadata that was previously provided to the remote computing device is the same as the current metadata), the request can be provided without any additional metadata. In response, the remote automated assistant can utilize the version of the metadata that was previously sent in order to process the request, such as determine a phone number for "Sue." Thus, in instances where the metadata does not change, computing resources are conserved by not requiring any of the contact information to be sent every time a user submits a request to make a phone call.

In some implementations, the user may add, delete, and/or update metadata between requests that require the metadata. For example, the user may submit a request to make a phone call, then subsequently add an additional contact before submitting a second request to make a phone call. In some implementations, the client automated assistant can identify the metadata (e.g., the contacts list of the user) and compare the metadata to the last metadata that was provided to the remote automated assistant. A set of operations can be provided to the remote computing device with the request that, when executed by the remote automated assistant, can transform the previously sent metadata into the current metadata.

As an example, the user may first make a request to "Call Bob," and the metadata that includes the contacts of the user can be provided to the remote automated assistant. Subsequently, the user may add a new contact of "Sue" with a corresponding phone number. After the user has added the new contact, the user can request to "Call Sue." The client automated assistant can determine that the current metadata (i.e., the user contacts) does not match the last metadata that was provided to the remote automated assistant. In response, the client automated assistant can determine a difference; in this example, the addition of a contact entry for "Sue." The client automated assistant can then provide an operation (e.g., "Add 'Sue: 555-555-5555'") without providing any additional metadata, such as the contact information for "Bob" and/or other contacts. Thus, once the initial metadata is provided, subsequent requests that require the metadata can be fulfilled without requiring all of the metadata to be provided with the request. By mitigating the need to send all of the metadata with each request, computing and/or network resources can be conserved by reducing the volume of data that is transmitted with the request.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
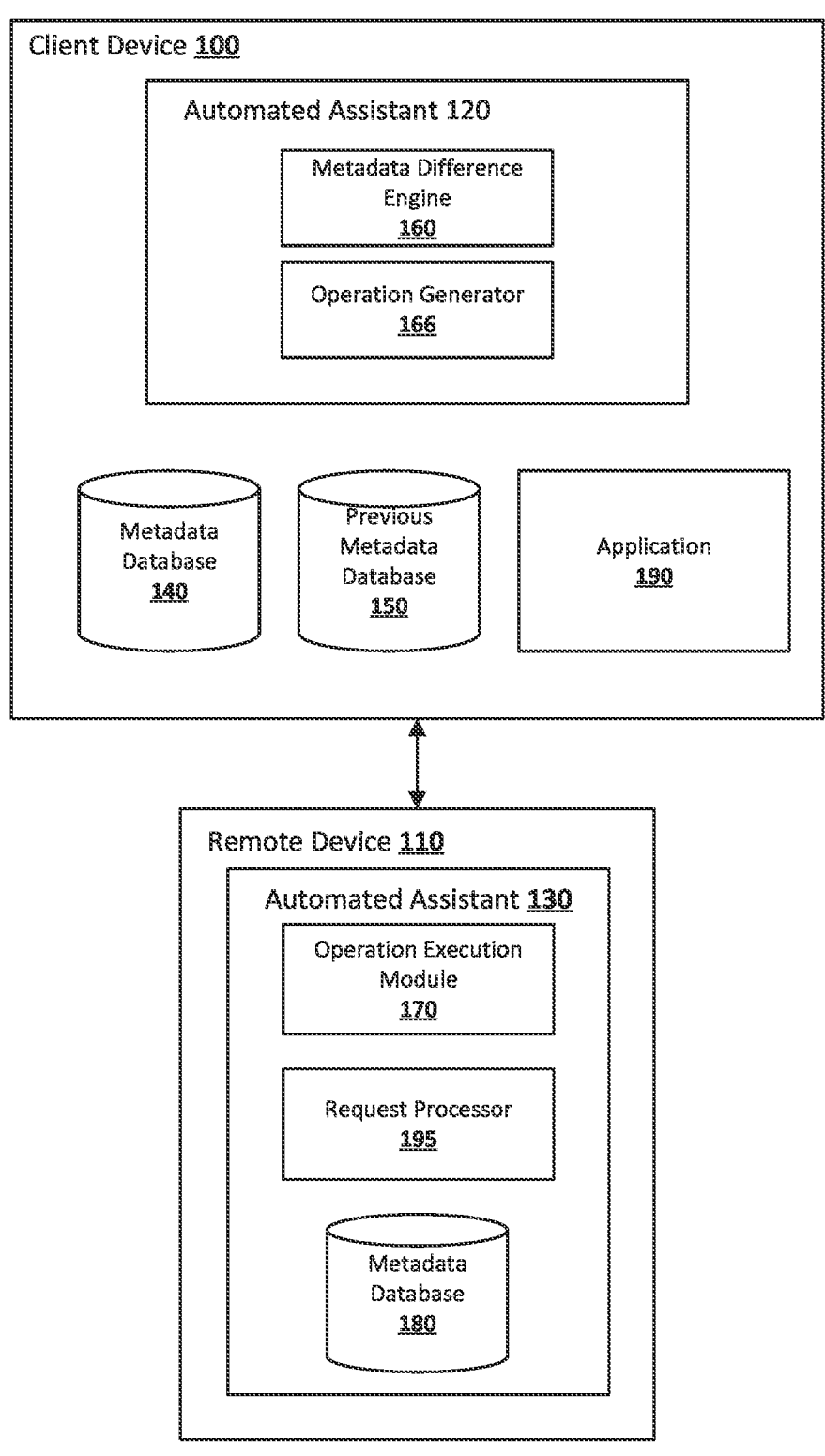
FIG. 1 is an illustration of an example environment in which implementations disclosed herein can be implemented.

Turning initially to FIG. 1, an example environment is illustrated in which various implementations can be performed. FIG. 1 includes a client device 100, which executes an instance of an client automated assistant 120. Further, the example environment includes a remote device 110, which can be, for example, a server that is in communication with the client device 100. The remote device 110 is executing one or more cloud-based automated assistant components, such as remote automated assistant 130, which can be implemented on one or more computing systems (collectively referred to as a "cloud" computing system), that includes remote device 110. The "cloud" computing system can include one or more computing systems that are communicatively coupled to assistant device 100 via one or more local and/or wide area networks (e.g., the Internet). The client automated assistant 120, via interaction(s) with remote automated assistant 130, can form what appears to be, from the user's perspective, a logical instance of an automated assistant with which the user may engage in a human-to-computer dialog.

The assistant device 100 can be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device).

Client automated assistant 120, in conjunction with remote automated assistant 130, engages in human-to-computer dialog sessions with a user via user interface input and output devices of the client device 100. To preserve user privacy and/or to conserve resources, in many situations a user must often explicitly invoke the client automated assistant 120 before the automated assistant will fully process a spoken utterance. The explicit invocation of the client automated assistant 120 can occur in response to certain user interface input received at the client device 100. For example, user interface inputs that can invoke the client automated assistant 120 via the client device 100 can optionally include actuations of a hardware and/or virtual button of the client device 100. Moreover, the client automated assistant 120 can include one or more local engines, such as an invocation engine that is operable to detect the presence of one or more spoken general invocation wakewords. The invocation engine can invoke the client auto-mated assistant 120 in response to detection of one of the spoken invocation wakewords. For example, the invocation engine can invoke the automated assistant 100 in response to detecting a spoken invocation wakeword such as "Hey Assistant," "OK Assistant", and/or "Assistant". The invoca-tion engine can continuously process (e.g., if not in an "inactive" mode) a stream of audio data frames that are based on output from one or more microphones of the client device 100, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 120. As used herein, "invoking" the automated assistant 120 can include causing one or more previously inactive functions of the client automated assistant 120 to be activated. For example, invoking the client automated assis-tant 120 can include causing one or more local engines and/or cloud-based automated assistant components to fur-ther process audio data frames based on which the invoca-tion phrase was detected, and/or one or more following audio data frames (whereas prior to invoking no further processing of audio data frames was occurring). For instance, local and/or cloud-based components can process captured audio data using an ASR model in response to invocation of the client automated assistant 120.

Client automated assistant 120 and/or remote automated assistant can include one or more request processor 195 components that can process spoken utterances of a user that are received by the client device 100. For example, one or more of the client automated assistant 120 and/or remote automated assistant 130 can include an automatic speech recognition (ASR) engine, a natural language understanding (NLU) engine, a text-to-speech (US) engine, and/or a ful-fillment engine. In some implementations, one or more of these engines can be omitted, implemented by only one portion of the automated assistant (e.g., implemented only by cloud-based automated assistant component(s) 130) and/or additional engines can be provided (e.g., an invocation engine described above).

The ASR engine can process audio data that captures a spoken utterance to generate a recognition of the spoken utterance. For example, the ASR engine can process the audio data utilizing one or more ASR machine learning models to generate a prediction of recognized text that corresponds to the utterance. In some of those implementa-tions, the ASR engine can generate, for each of one or more recognized terms, a corresponding confidence measure that indicates confidence that the predicted term corresponds to the spoken utterance.

The TTS engine can convert text to synthesized speech, and can rely on one or more speech synthesis neural network models in doing so. The TTS engine can be utilized, for example, to convert a textual response into audio data that includes a synthesized version of the text, and the synthe-sized version audibly rendered via hardware speaker(s) of the client device 100.

The NLU engine determines semantic meaning(s) of audio and/or text converted from audio by the ASR engine, and determines assistant action(s) that correspond to those semantic meaning(s). In some implementations, the NLU engine determines assistant action(s) as intent(s) and/or parameter(s) that are determined based on recognition(s) of the ASR engine. In some situations, the NLU engine can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine in resolving intent(s) and/or parameter(s). In those situations, the NLU engine can optionally work in concert with a dialog manager engine that determines unresolved intent(s) and/or param-eter(s) and/or generates corresponding prompt(s). The NLU engine can utilize one or more NLU machine learning models in determining intent(s) and/or parameter(s).

A fulfillment engine can cause performance of assistant action(s) that are determined by the NLU engine. For example, if the NLU engine determines an assistant action of "turning on the kitchen lights", the fulfillment engine can cause transmission of corresponding data (directly to the lights or to a remote server associated with a manufacturer of the lights) to cause the "kitchen lights" to be "turned on". As another example, if the NLU engine determines an assistant action of "provide a summary of the user's meet-ings for today", the fulfillment engine can access the user's contacts, identify a phone number for a user that is indicated in a spoken utterance, and cause one or more applications, executing in part and/or entirely on client device 100, to initiate a phone call with the intended party.

In some implementations, due to computing resource constraints of the client computing device, some or all of the processing of a request can be handled remotely by the remote automated assistant 130 executing on the remote computing device 110. For example, due to limited com-puting resources, such as processor power, battery life, and/or limited memory, client automated assistant 120 may not be configured to process a request that is received by the client device 100. For example, client automated assistant 120 may include an invocation engine, as previously described, but may not be configured to perform ASR and/or NLU. Thus, when a request is received, the audio data (or, in some instances, text representative of the audio data) are transmitted to the remote automated assistant 130 for further processing. The remote device 110 can have more comput-ing resources to allow for ASR, NLU, and/or other process-ing to be performed by the remote automated assistant 130. Once processed, the remote automated assistant 130 can determine how to fulfill the request and facilitate causing performance of one or more actions. For example, remote automated assistant 130 may determine that a request is to make a phone call and can generate a request to place the phone call. The request can be provided to the client device and client automated assistant 120 can further facilitate providing the request to an application to cause the phone call to be placed.

In some implementations, the remote automated assistant 130 may require at least some metadata that is stored locally on the client device in order to process a request. Metadata database 140 can include, for example, user contact infor-mation, user settings for the client device 100 and/or user setting for one or more application that are executing on the client device, indications of applications that are installed on the client device 100, capabilities of the client device 100 (e.g., indications of UI components), and/or other metadata that is accessible locally to the client device 100 but may not be available to the remote device 110. When a user utters a spoken utterance, client automated assistant 120 can provide some or all of the available metadata to the remote auto-mated assistant 130 so that the remote automated assistant 130 can process the request. For example, for a request of "Call Sue," remote automated assistant 130 may require access to the contacts of the user such that a phone number for "Sue" can be identified and included in a request that is transmitted to a phone calling application.

In some implementations, metadata can include indications of applications that are currently installed on the client device. For example, metadata can include indications that a client device has a calendar application, a music playback application, and an application that can place phone calls. In some instances, a user may install additional applications and/or uninstall applications between making requests to an automated assistant application. Thus, at any given time, the state of the applications that are currently installed on the client device can be determined and are dynamic based on actions of the user between state determinations.

In some implementations, metadata can include capabilities of the client device. Capabilities can include, for example, indications of hardware that is associated with the client device (e.g., GUI, headphones, audio capabilities, connected external peripheral devices) and/or can include other metadata that indicates the capabilities of the device (e.g., processor capabilities, memory capacity, battery life). Thus, metadata that is identified for the client device can indicate what types of requests can be handled by the client device and/or whether a client device is configured to handle a particular type of request.

In some implementations, metadata can include information that is specific to a particular application that is installed on the client device. For example, a client device can have a calendar application that is locally installed, and the calendar application can have metadata associated with it that indicates entries in the calendar application. Also, for example, as previously mentioned, a messaging application and/or an application that places phone calls can have a contacts list that can be added to, deleted from, and/or updated by the user between requests to utilize the application.

In some implementations, local automated assistant 120 can determine that a request should be handled, at least in part, by the remote automated assistant 130 and that additional information, in the form of metadata, will be required by the remote automated assistant 130 in order to process the request. For example, remote automated assistant 130 can include NLU components that are not available to the client device 100. In order to determine an intent of a request, at least some portion of metadata that is stored locally on the client device 100 may be required in order for an NLU component of the remote automated assistant to determine intent and/or otherwise process a request. Thus, in some instances, client device 100 can provide, with a spoken utterance (or text representative of the spoken utterance), metadata that can be utilized by the remote automated assistant 130 in processing the spoken utterance.

As an example, the user can utter the utterance "OK Assistant, Call Bob." The phrase "OK Assistant" can be handled by an invocation engine that is a component of the client automated assistant 120, but the client automated assistant, due to resource constraints, may not be capable of performing ASR and/or NLU (or may have limited capabilities to do so). Thus, the spoken utterance (or a textual representation) can be provided to the remote automated assistant 130, which may have more computing resources and may thus have more capabilities to process the request. The client automated assistant 120 can provide, with the unprocessed and/or partially processed spoken utterance, metadata that can be utilized by the remote automated assistant 130. For example, the metadata database 140 can include contact information that is stored locally on the client device 100. The contact information can be provided to the remote automated assistant 130 such that the remote automated assistant 130 can generate a request to direct to one or more components and/or applications that are executing on client device 100, such as application 190.

In some implementations, client automated assistant 120 may not be configured to process the received audio data and may provide, with all requests, a corpus of metadata that will allow the remote automated assistant 130 to handle processing of any request. For example, client automated assistant 120 may not be able to determine an intent of a request and thus may not be able to determine what metadata to provide to the remote computing device 110. Thus, for each request, client automated assistant 120 may provide metadata that includes, for example, application data from multiple applications, device capabilities, indications of applications installed on the client device 100, and/or additional metadata such that, regardless of the request, the remote automated assistant 130 has access to the metadata needed to process the request.

In some implementations, remote automated assistant 130 and/or a component of the remote device 110 can store the metadata in remote metadata database 180. For subsequent requests that are similar to a request that has already been submitted by the user (e.g., a second request to "Call" a contact), remote metadata database 180 has a copy of the metadata in order to process a request and therefore client automated assistant 120 does not need to transmit the metadata with the spoken utterance. Thus, for subsequent calls, computing resources are conserved by not requiring metadata to be transmitted with the request when the metadata has not changed between requests. Remote automated assistant 130 can utilize the copy in remote metadata database 180 to process the request.

Figure 2:
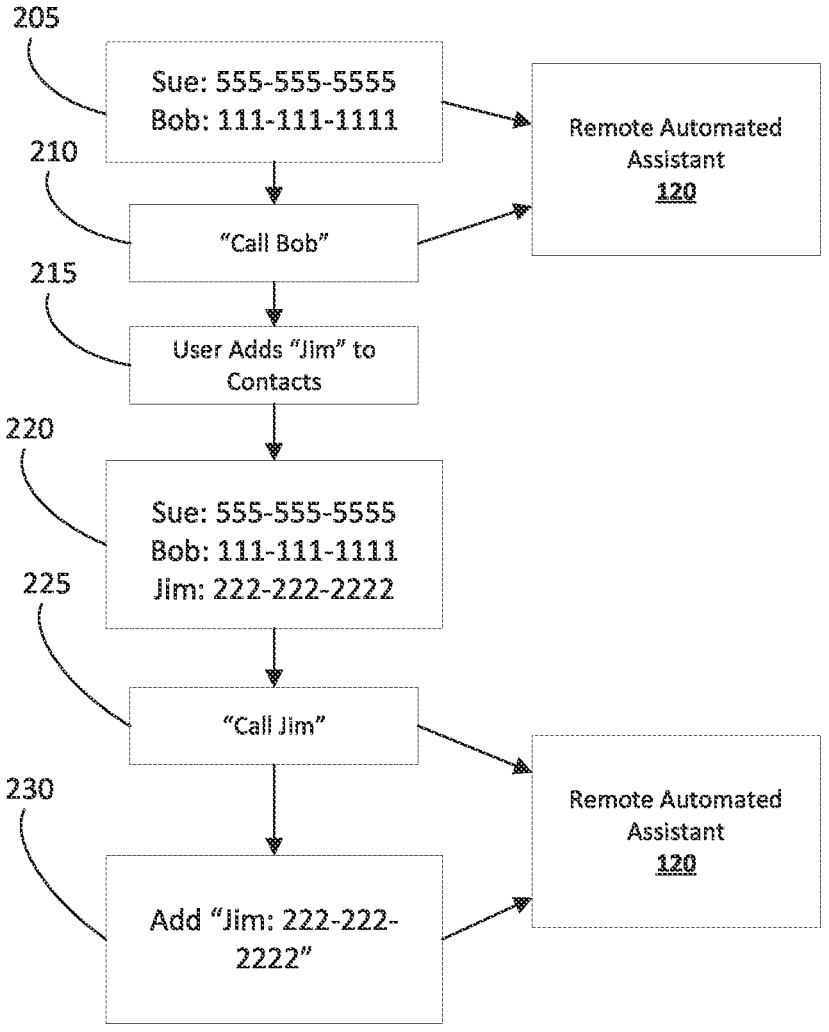
FIG. 2 illustrates a series of events that occur on a client device and the states of metadata of the client device at the time of the events.

However, in some instances, the user may update, add, and/or delete metadata between requests. For example, referring to FIG. 2, the initial metadata 205 includes two entries: "Sue" and "Bob." The user utters the request "Call Bob" and initial metadata 205 can be provided to the remote device 120 along with the partially processed request. Subsequently, the user updates a contact listing 215, thus resulting in new metadata 220. Subsequent to updating contact information, the user makes another request to place a phone call ("Call Jim" 225). Because the remote device 110 has a copy of the initial metadata 205, which, in this instance, does not include an entry for "Jim"), an operation 220 is provided to the remote automated assistant 120 with the audio data and before remote automated assistant 130 processes the request.

Referring again to FIG. 1, client automated assistant 120 includes a metadata difference engine 160 that can determine a difference between two sets of metadata. For example, when metadata is transmitted to the remote device 110, a copy of the transmitted metadata can be stored in previous metadata database 150. New metadata can be identified and/or generated and metadata difference engine 160 can compare the new metadata with the metadata that is stored in previous metadata database 150. A difference between the previously transmitted metadata and the current (i.e., "new" metadata) can be generated to determine what may have changed (e.g., been added to, metadata removed from, and/or metadata otherwise changed by the user) since the previous metadata was transmitted.

Figure 3:
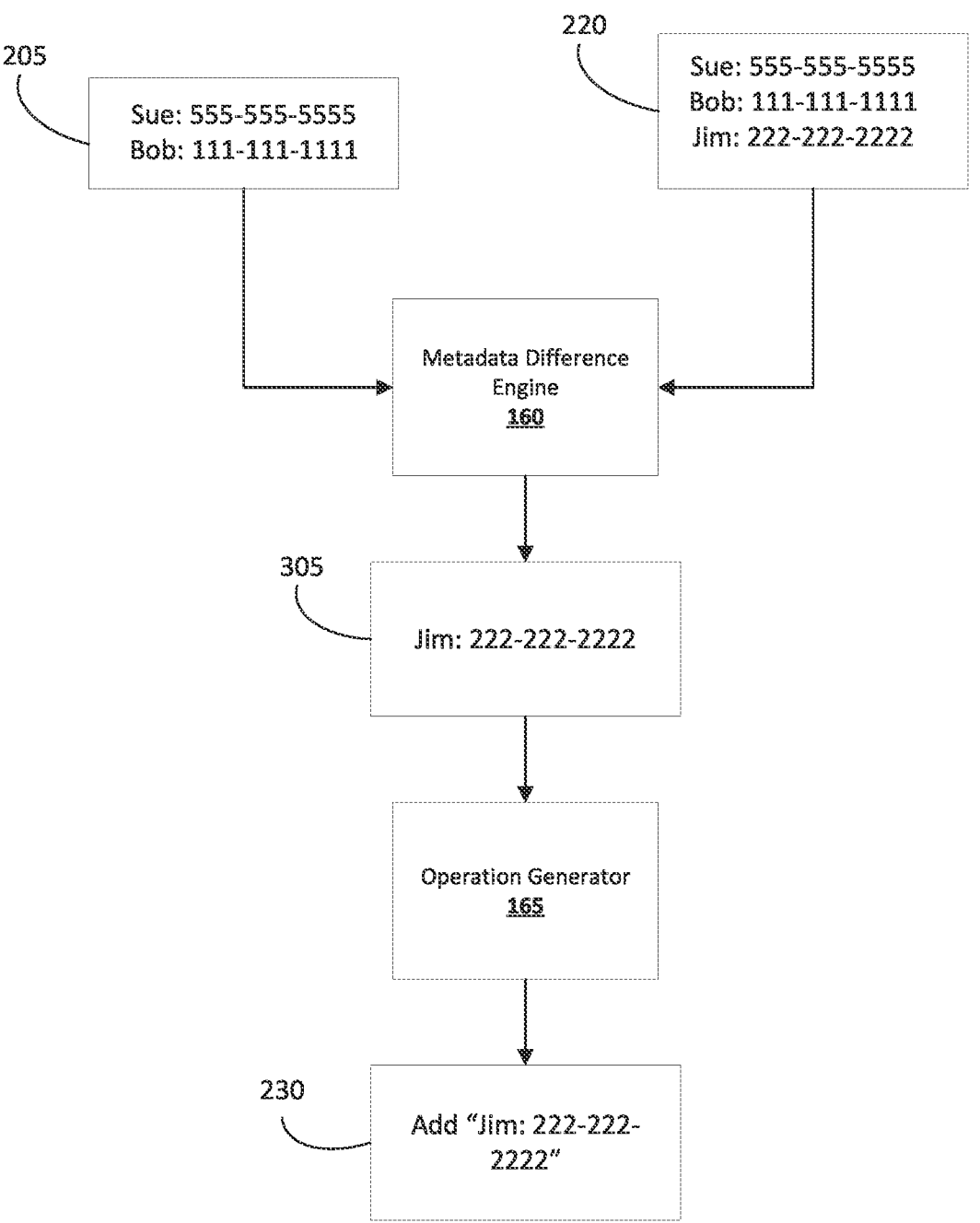
FIG. 3 is a flowchart illustrating previous metadata that is stored on a client device and operations generated based on a difference between the current metadata and previous metadata.

For example, referring to FIG. 3, an example of generating a metadata difference between two sets of metadata is provided. As illustrated, initial metadata 205 includes two entries of a user's contacts. Subsequent to the user adding a contact, new metadata 220 includes three entries (i.e., the addition of "Jim"). The two sets of metadata are provided to the metadata difference engine 160, which determines a difference 305 between the sets of metadata. The difference metadata 230 is generated and can be provided to the remote automated assistant 130 when the user submits, for example, a request to place a phone call, as previously described.

In some implementations, operation generator 165 can determine, based on identified differences between the previous metadata and current metadata, one or more operations that, when performed on the previous metadata, can generate the current metadata. For example, returning to the example of FIG. 3, an entry for "Jim" is included in metadata 220 that was not included in metadata 205. In response, operation generator 165 can determine that an operation of "Add Jim: 222-222-2222," when performed on metadata 205, can generate metadata 220.

Figure 4:
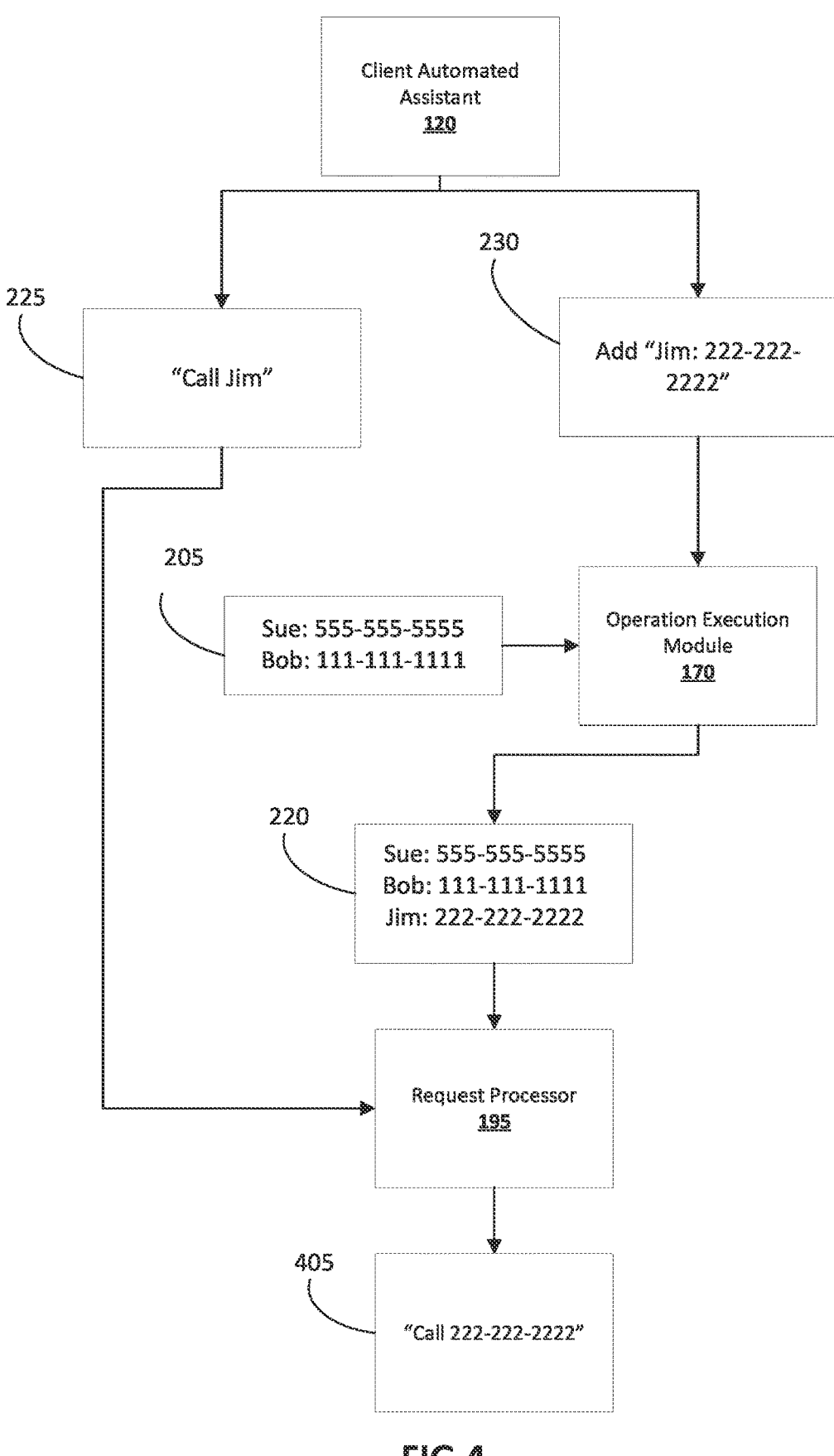
FIG. 4 is a flowchart illustrating previous metadata that is stored on a remote device and the result of the metadata after one or more operations are performed on the metadata.

Once the operations are provided to the remote automated assistant 130, operation execution module 170 can identify previous metadata that was provided by the client automated assistant 120 previously, and execute the one or more operations to generate new metadata that matches the current metadata of the client device 100. For example, referring to FIG. 4, metadata 205 is a copy of the metadata that was initially provided to the remote automated assistant 130. The metadata 205 includes two entries: "Sue" and "Bob." Remote automated assistant 130 can identify the initial metadata 205 in metadata database 180. For example, when client automated assistant 120 first transmitted a request to remote automated assistant 130, the request is transmitted along with the initial metadata 205, which was stored in metadata database 180 and utilized by remote automated assistant 130 to process the accompanying request. The new request 225 is then received with operations 230, which were previously generated by operation generator 165.

Before processing the request 225, operation execution module 170 can determine, based on the previous metadata 205 and the operations 230, the current metadata of the client device 100. For example, the operations 230 include an operation to "Add Jim: 222-222-2222," which can be performed on the previous metadata 205 by operation execution module 170, resulting in new (i.e., "current") metadata 220. As illustrated, the current metadata 220 now includes all of the information that was included in the initial metadata 205 with the addition of a new entry for "Jim." The current metadata 220 can then be utilized by request processor 195 of remote automated assistant 130 to process the request and send fulfillment data 405 to client automated assistant 120 for fulfillment. Further, current metadata 220 can be stored in metadata database 180 for utilization in processing future requests.

As illustrated, the remote automated assistant 130 utilized new metadata (i.e., "Jim" entry) to generate a response. However, in some implementations, remote automated assistant 130 may utilize any of the metadata that is included in the metadata database 180 regardless of whether the metadata is new or previously provided. For example, if a user added "Jim" to the contact information between requests, resulting in an operation of "Add Jim . . . ," the operation would be transmitted with the next request, even if the next request does not include a request to "Call Jim" (e.g., a request of "Call Sue"). Thus, operations are provided with each request without regard to whether the operation(s) result in new metadata that will be used or whether the request will require metadata that had been previously provided. In other words, the operations are independent from the request and processing of the request may not require new metadata even in instances where the operations result in new metadata.

In some implementations, and as previously described, operations execution module 170 can perform additions, deletions, updates, and/or other operations on metadata that is stored in metadata database 180. For example, a user may uninstall an application that is executing on the client device 100, resulting in an operation of "Delete Application 1." After executing the operation, the new metadata will include the applications executing on client device 100 without including "Application 1." Also, for example, a user may connect headphones to the client device 100, resulting in audio output from the headphones and not from a speaker of the client device 100. An operation of "Change audio output from device to headphones" may be generated to indicate the change in a status of the client device 100. Once the operation has been executed, the metadata will reflect the change.

In some implementations, the remote automated assistant 130 may transmit a confirmation to the client automated assistant, with the processed request, indicating success in updating the metadata. For example, operation execution module 170 may first determine that the metadata has been successfully transformed and provide an indication of the completion of the transformation before client device 100 replaces the previous metadata with the current metadata. In instances whereby the transformation is not successful, the previous metadata can be maintained, a new difference can be determined, and/or operations can be retransmitted such that metadata stored in metadata database 180 is always current and accurate without the possibility of loss of additions, deletions, and/or updates to the metadata.

In some implementations, remote automated assistant 130 may handle requests from multiple devices and/or multiple users that are utilizing the same device. Separate metadata can be maintained for each user and/or for each device by remote automated assistant 130 to ensure that, for a given request, the current state of the client device that provided the request is known. For example, in some implementations, a request may be provided with an identifier that indicates a user and/or device that provided the request and the identifier can be associated with particular metadata stored in the metadata database 180. Thus, for "User 1," a request to "Call Jim" can be provided with an identifier of "User 1" and the metadata of "User 1" can be identified in the metadata database. Similarly, different metadata can be utilized to handle a request to "Call Bob" when the request originated with "User 2," and an identifier of "User 2" can be provided with the request to indicate to utilize the metadata associated with "User 2."

Figure 5:
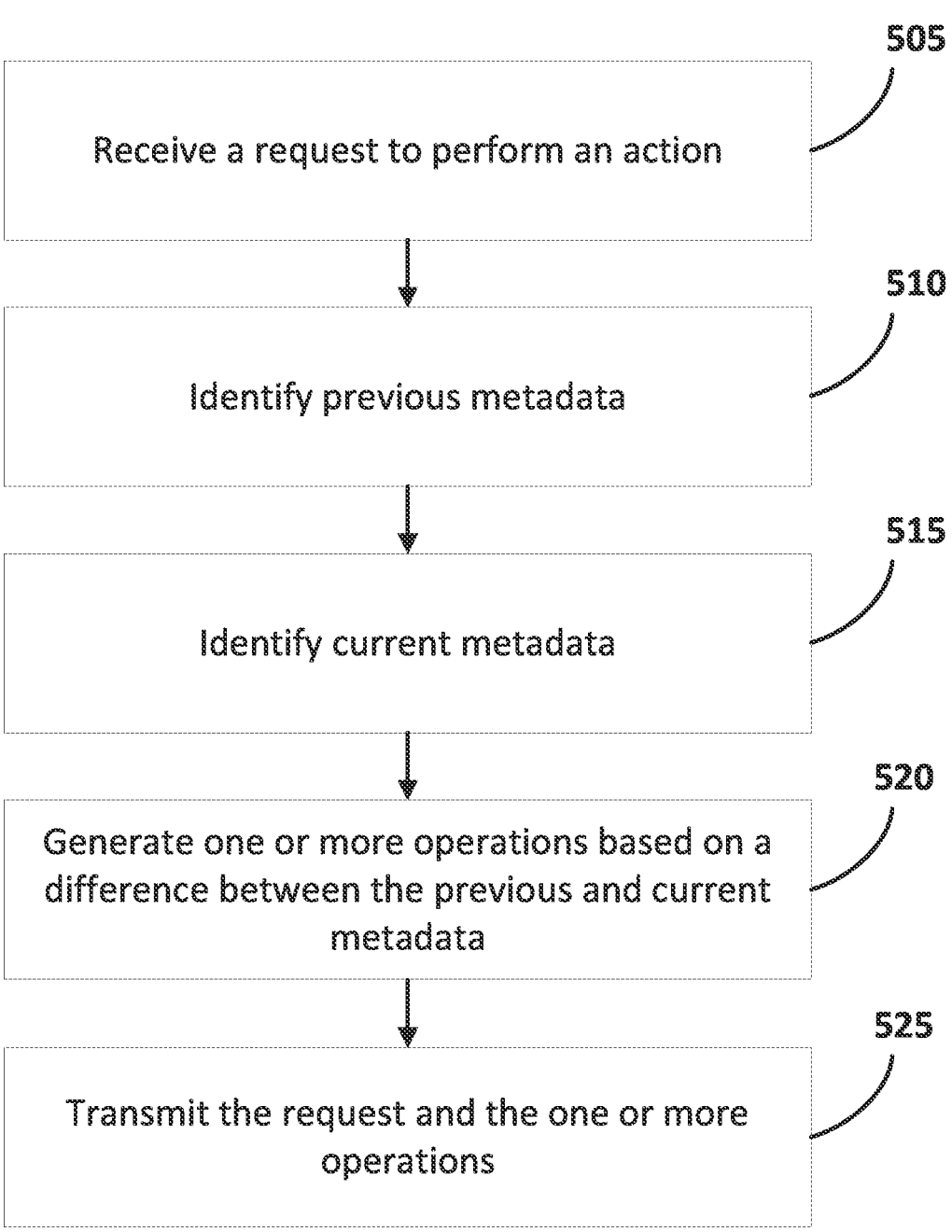
FIG. 5 is a flowchart illustrating an example method according to various implementations disclosed herein.

Referring to FIG. 5, a flowchart is provided that illustrates a method of generating and transmitting one or more operations, with a request, to update a remote version of metadata stored on a remote device. In some implementations, one or more steps of the method can be omitted or combined, and/or one or more additional steps can be included in the method. The method can be performed by one or more components that are illustrated in the environment of FIG. 1.

At step 505, a request to perform an action is received. The request can be received by a device that shares one or more characteristics with client device 100. In some implementations, the request may be received as audio data that is spoken by a user of the client device 100. Client device 100 is executing, at least in part, an automated assistant 120 that can handle at least some of the processing of requests. In some implementations, at least a portion of the automated assistant is in communication with a remote automated assistant 130 that can handle at least some of the processing of requests. For example, client device 100 can receive audio data that includes a request, and client automated assistant 120 can transmit the audio data to remote auto- mated assistant 130 for further processing.

At step 510, previous metadata of the client device is identified. Metadata can include, for example, indications of applications that are executing on the client device, capabilities of the client device, application-specific information (e.g., calendar entries, user contacts), and/or other information related to the state of the client device 100. In some implementations, client automated assistant 120 may perform initial processing of the request (e.g., some initial ASR, NLU) to determine a type of request and may identify specific metadata that may be utilized to perform additional processing. For example, a user may utter the request "Call Bob" and client automated assistant 120 may determine that the request is directed to a phone calling application and further identify metadata that includes contacts of the user. In some implementations, client automated assistant 120 may not perform any initial processing of received requests but instead may identify metadata that includes device state information for all aspects of the client device 100 (e.g., metadata that includes all applications currently installed on the client device, device capabilities, application data, and/ or other metadata related to the state of the client device 100).

When a request is provided to the remote automated assistant 130 for further processing, the metadata of the device may be provided with the request. For example, in order to process a request of "Call Bob," remote automated assistant 130 may require the contacts of the user, which may be stored on the client device 100. Thus, when a request is first received, all of the metadata of the client device 100 may be provided to the remote computing device 110 with the request. Subsequently, when a new request is received, the metadata that was initially provided to the remote automated assistant 130 (i.e., "previous metadata") is identified at step 510.

At step 515, current metadata of the client device is identified. The current metadata is the metadata of the client device 100 at the time when the new request is received. In some instances, the user may change one or more aspects of the client device 100 between requests such that the current metadata is not the same as the previous metadata that was provided with the previous request. In those instances, the current metadata and the previous metadata will not be the same. Before the request can be transmitted to the remote automated assistant, the remote version of the metadata, stored in metadata database 180, must be updated to reflect the current state of the client device 100.

At step 520, one or more operations are generated based on a difference between the previous metadata and the current metadata. As previously described, in some instances, the user may change one or more aspects of the client device 100 such that metadata associated with the state of the client device 100 differs from the previous metadata provided to the remote automated assistant 130. Metadata difference engine 160 can determine a difference between the current metadata, stored in metadata database 140, and the previous metadata, stored in the previous metadata database 150. Any additions, deletions, and/or updates to the metadata can be identified and operations can be generated that reflect the differences between the previous metadata and the current metadata. For example, an operation of "Add Application 1" can be generated if, based on the difference in the metadata, an application named "Application 1" was installed since the previously receiving a request.

At step 525, the request and the one or more operations are transmitted to a remote computing device for further processing. Operation execution module 170 can execute the one or more provided operations to transform the previous metadata into the current metadata. For example, metadata database 180 can include the previous metadata that was either initially provided to the remote automated assistant 130 with a request and/or that has been transformed one or more times based on operations that were provided with previous requests. In some implementations, operation execution module 170 can identify the metadata associated with the client device 100 and/or a user of the client device 100 that provided the request, and execute the one or more operations to generate a mirror version of the current metadata of client device 100. Once the current metadata has been generated, the remote automated assistant 130 can process the request using the newly generated version of the metadata.

Figure 6:
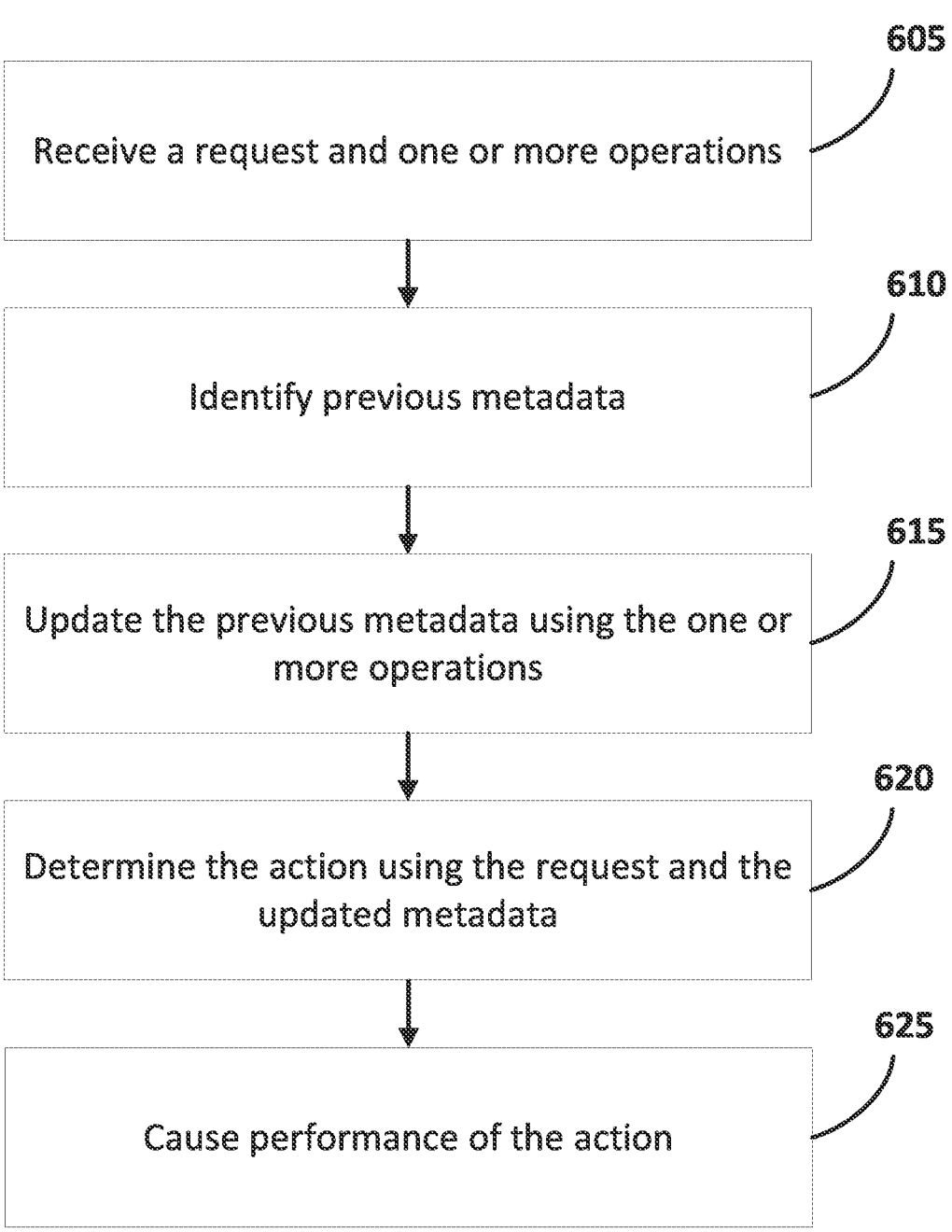
FIG. 6 is a flowchart illustrating an example method according to various implementations disclosed herein.

Referring to FIG. 6, a flowchart is provided that illustrates a method of causing performance of an action that is determined based on a version of updated metadata stored on a remote device. In some implementations, one or more steps of the method can be omitted or combined, and/or one or more additional steps can be included in the method. The method can be performed by one or more components that are illustrated in the environment of FIG. 1.

At step 605, a request and one or more operations are received by a remote computing device. The request can be transmitted by a computing device that shares one or more characteristics with client device 100. The request and the one or more operations can be received by a computing device that shares one or more characteristics with remote device 110. As previously described with regards to FIG. 5, the one or more operations can include additions, deletions, and/or updates that may be performed on a previous version of the metadata that is stored on the remote computing device 110. For example, initially provided metadata representing a current state of the client computing device 100 may be provided with an initial request. The one or more operations can be generated utilizing a technique that shares one or more characteristics with the method described with regards to FIG. 5.

At step 610, previous metadata of the client device is identified. The previous metadata is a remote version of the state of the client device 100 at the time when the most previous request was provided to the remote automated assistant 130. For example, when a first request is received by the remote device 110, the request can be provided with metadata and/or one or more operations that may be executed to generate metadata indicative of the current state of the client device 100. The metadata can be stored in a database that shares one or more characteristics with metadata database 180. When the remote automated assistant 130 receives a subsequent request and one or more operations, the previous metadata can be identified in metadata database 180.

In some implementations, metadata database 180 may store metadata for multiple computing devices and/or multiple users of a computing device. In some implementations, the request and one or more operations can be provided with an identifier of the transmitting client device and/or of the user that provided the request. For example, a request from "User 1" may be provided with an indication of "User 1" and one or more operations to perform in order to generate a remote version of the current state of the client device for "User 1." Remote automated assistant 130 can identify the corresponding metadata based on the indication of "User 1," which may be unique to the user and include, for example, the contacts of the user, calendar entries for the user, and/or one or more applications to which the user has access.

At step 615, the previous metadata is updated by executing the one or more operations. The operations can include, for example, adding additional information to the previous metadata, deleting information from the previous metadata, and/or otherwise updating the metadata. Once the one or more operations are performed on the metadata, the resulting new metadata mirrors the current state of the metadata of the client device. Thus, instead of transmitting the entirety of the metadata of the client device with the request, only one or more operations that indicate changes to the metadata are transmitted. The new version of the metadata can be stored in metadata database 180 for further use in processing the request and for use with subsequent requests.

At step 620, an action is determined based on the request and the updated metadata. The action can be determined by performing one or more processes on the request, such as ASR, NLU, and/or other methods that can determine an action that corresponds to the request. In some implementations, in order to determine the action, the remote automated assistant 130 may require additional metadata of the client computing device 100. To identify the necessary information, remote automated assistant 130 can identify the metadata corresponding to the client device in metadata database 180. As previously described, the metadata stored in metadata database 180 may have been updated based on one or more operations that were received with the request. Thus, the metadata stored in metadata database 180 is a remote version of the same metadata as was present on the client device 100 when the request was transmitted.

At step 625, the action is performed by one or more computing devices. For example, remote automated assistant 130 can generate fulfillment data that can be provided to client automated assistant 120 such that client automated assistant 120 can determine a destination to provide the fulfillment data and further facilitate the fulfillment of the request by causing performance of the action. As an example, a user may submit a request of "Call Jim," which is provided to remote automated assistant 130. Remote automated assistant 130 can identify a phone number for "Jim" based on the remote version of the metadata that is stored on the remote computing device 110 and further generate an action that can be provided back to the client automated assistant 120, such as "Call 555-555-5555." Remote automated assistant 120 can be configured to further facilitate fulfillment of the action, such as by directing the fulfillment data to an application 190 that is executing on the client device 100.

Figure 7:
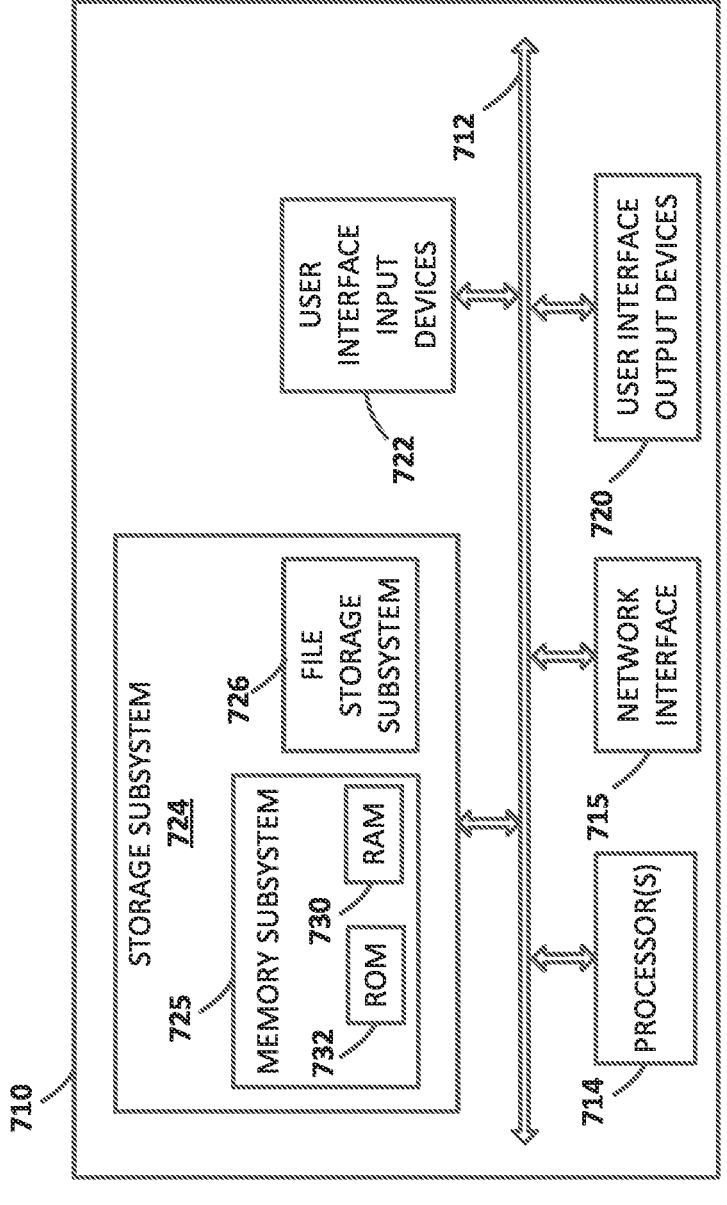
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIG. 5 and FIG. 6, and/or to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors of a client device is provided and includes receiving, from a user, a request for an automated assistant to perform an action. The automated assistant includes a local automated assistant component executing on the client device and a remote automated assistant component that is executing on a remote device. In response to receiving the request, the method further includes identifying previous metadata stored on the client device, wherein the previous metadata represents a previous state, of the client device, at a previous time of an immediately previous request for the automated assistant; identifying current metadata, wherein the current metadata represents a current state of the client device; generating, based on a difference between the previous metadata and the current metadata, one or more operations that, when executed by the remote device, transform the previous metadata to the current metadata; and transmitting, to the remote automated assistant component, the request and the one or more operations. Transmitting the request and the one or more instructions causes the remote device to update a remote version of the metadata by executing the one or more operations on a version of the previous metadata stored on the remote device; determine, based on the request and the updated remote version, the action; and cause performance of the action.

These and other implementations of the technology disclosed herein can include one or more of the following features.

In some implementations, the method further includes receiving, by the client device and from the remote device, confirmation that the remote version of the metadata was successfully updated. In response to receiving the confirmation, the method further includes updating the previous metadata to reflect the current metadata.

In some implementations, the previous metadata includes one or more indications of applications that were installed on the client device at the previous time and wherein the current metadata includes (a) an indication of an additional application that is currently installed on the client device and that is not among the applications indicated by the previous metadata and/or (b) a lack of an indication of a given application, of the applications indicated by the previous metadata, being currently installed on the client device. In some of those implementations, performance of the action comprises use of the additional application.

In some implementations, the previous metadata includes one or more indications of capabilities of the client device at the previous time and wherein the current metadata includes (a) an indication of an additional capability of the client device that differs from the capabilities indicated by the previous metadata and/or (b) a lack of an indication of a given capability, of the capabilities indicated by the previous metadata.

In some implementations, the previous metadata includes one or more contacts of the user and wherein the current metadata includes (a) a contact that is not among the contacts indicated by the previous metadata and/or (b) a lack of an indication of a given contact, of the contacts indicated by the previous metadata.

In some implementations, the current metadata includes additional information that is not included in the previous metadata, and wherein the one or more operations include an instruction to add the additional information.

In some implementations, the previous metadata includes additional information that is not included in the current metadata, and wherein the one or more operations include an instruction to delete the additional information.

In other implementations, a method implemented by one or more processors is provided and includes receiving, from a client device: a request for an automated assistant to perform an action, and one or more operations, wherein the automated assistant includes a local automated assistant component executing on the client device and a remote automated assistant component that is executing on the remote device. In response to receiving the request and the one or more operations, the method further includes identifying a remote version of the metadata, stored on the remote device, wherein the remote version of the metadata represents a previous state of the client device when an immediately previous request was received from the client device; updating the remote version of the metadata by executing the one or more operations on the remote version of the metadata; determining, based on the request and the updated remote version, the action; and causing performance of the action.

These and other implementations of the technology disclosed herein can include one or more of the following features.

In some implementation, the method further includes receiving, with the request and the one or more operations, an identifier of the client device and/or of a user of the client of device, wherein identifying the remote version of the metadata is based on the received identifier, and wherein the remote version of the metadata is unique to the client device and/or the user.

In some implementations, the method further includes transmitting, to the client device, confirmation that the remote version of the metadata was successfully updated, wherein transmitting the confirmation causes the client device to update a previous version of the metadata, stored on the client device, to reflect current metadata of the client device.

In some implementations, the request includes audio data, and determining the action includes performing at least one of automatic speech recognition, natural language understanding, and/or speech to text analysis based on the request.

In some implementations, the updated remote version includes additional metadata that is not included in the remote version, and the action is based on at least a portion of the additional metadata.

In other implementations, a system provided and includes a client computing device and a remote computing device each including at least one corresponding processor and corresponding memory storing corresponding processor-executable code. The client computing device is configured to receive a user request for an automated assistant, executing on the client computing device to perform an action. In response to receiving the user request, the client computing device is further configured to identify previous metadata, stored on the client device at a previous time of an immediately previous user request, wherein the previous metadata represents a previous state of the client device at the previous time; identify current metadata, wherein the current metadata represents a current state of the client device; generate, based on a difference between the previous metadata and the current metadata, one or more operations that, when executed, transform the previous metadata to the current metadata; and transmit, to the remote computing device, the request and the one or more operations. The remote computing device is configured to receive, from the client device, the request and the one or more operations. In response to receiving the request and the one or more operations, the remote computing device is further configured to identify a remote version of the metadata, stored on the remote device, wherein the remote version of the metadata represents the previous state of the client computing device when the immediately previous request was received; update the remote version of the metadata by executing the one or more operations on the remote version of the metadata; determine, based on the request and the updated remote version, the action; and cause performance of the action.

These and other implementations of the technology disclosed herein can include one or more of the following features.

In some implementations, in causing performance of the action, the remote computing device is further configured to transmit fulfillment data to the client computing device; and the client computing device is further configured to: receive the fulfillment data and perform the action using the fulfillment data.

In some implementations, in causing performance of the action, the remote computing device is configured to transmit fulfillment data to an additional remote computing device.

In some implementations, the remote computing device is further configured to transmit confirmation that the remote version of the metadata was successfully updated. The client computing device is configured to update the previous metadata to reflect the current metadata.

In some implementations, the previous metadata includes one or more indications of applications that were installed on the client device at the previous time and the current metadata includes (a) an indication of an additional application that is currently installed on the client device and that is not among the applications indicated by the previous metadata and/or (b) a lack of an indication of a given application, of the applications indicated by the previous metadata, being currently installed on the client device.

In some implementations, the previous metadata includes one or more indications of capabilities of the client device at the previous time and the current metadata includes (a) an indication of an additional capability of the client device that differs from the capabilities indicated by the previous metadata and/or (b) a lack of an indication of a given capability, of the capabilities indicated by the previous metadata.

In some implementations, the previous metadata includes one or more contacts of the user.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method, implemented by one or more processors of a client device, comprising:

receiving, from a user, a request for an automated assistant to perform an action, wherein the automated assistant includes a local automated assistant component executing on the client device and a remote automated assistant component that is executing on a remote device; and in response to receiving the request:

identifying previous metadata stored on the client device, wherein the previous metadata represents a previous state, of the client device, at a previous time of an immediately previous request for the automated assistant;

identifying current metadata, wherein the current metadata represents a current state of the client device;

generating, based on a difference between the previous metadata and the current metadata, one or more operations that, when executed by the remote device, transform the previous metadata to the current metadata; and transmitting, to the remote device, the request and the one or more operations;

wherein transmitting the request and the one or more operations causes the remote device, in response to receipt of the request and the one or more operations by the remote device, to:

update a remote version of the metadata by executing the one or more operations on a version of the previous metadata stored on the remote device;

determine, based on the request and the updated remote version, the action; and cause performance of the action.

2. The method of claim 1, further comprising:

receiving, by the client device and from the remote device, confirmation that the remote version of the metadata was successfully updated; and in response to receiving the confirmation:

updating the previous metadata to reflect the current metadata.

3. The method of claim 1, wherein the previous metadata includes one or more indications of applications that were installed on the client device at the previous time and wherein the current metadata includes (a) an indication of an additional application that is currently installed on the client device and that is not among the applications indicated by the previous metadata and/or (b) a lack of an indication of a given application, of the applications indicated by the previous metadata, being currently installed on the client device.

4. The method of claim 3, wherein performance of the action comprises use of the additional application.

5. The method of claim 1, wherein the previous metadata includes one or more indications of capabilities of the client device at the previous time and wherein the current metadata includes (a) an indication of an additional capability of the client device that differs from the capabilities indicated by the previous metadata and/or (b) a lack of an indication of a given capability, of the capabilities indicated by the previous metadata.

6. The method of claim 1, wherein the previous metadata includes one or more contacts of the user and wherein the current metadata includes (a) a contact that is not among the contacts indicated by the previous metadata and/or (b) a lack of an indication of a given contact, of the contacts indicated by the previous metadata.

7. The method of claim 1, wherein the current metadata includes additional information that is not included in the previous metadata, and wherein the one or more operations include an instruction to add the additional information.

8. The method of claim 1, wherein the previous metadata includes additional information that is not included in the current metadata, and wherein the one or more operations include an instruction to delete the additional information.

9. A method, implemented by one or more processors of a remote device, comprising:

receiving, from a client device:

a request for an automated assistant to perform an action; and one or more operations;

wherein the automated assistant includes a local automated assistant component executing on the client device and a remote automated assistant component that is executing on the remote device; and in response to the remote device receiving the request and the one or more operations from the client device:

identifying, by the remote device, a remote version of the metadata, stored on the remote device, wherein the remote version of the metadata represents a previous state of the client device when an immediately previous request was received from the client device;

updating, by the remote device, the remote version of the metadata by executing the one or more operations on the remote version of the metadata;

determining, by the remote device based on the request and the updated remote version, the action; and causing, by the remote device, performance of the action.

10. The method of claim 9, further comprising:

receiving, with the request and the one or more operations, an identifier of the client device and/or of a user of the client of device, wherein identifying the remote version of the metadata is based on the received identifier, and wherein the remote version of the metadata is unique to the client device and/or the user.

11. The method of claim 9, further comprising:

transmitting, to the client device, confirmation that the remote version of the metadata was successfully updated, wherein transmitting the confirmation causes the client device to update a previous version of the metadata, stored on the client device, to reflect current metadata of the client device.

12. The method of claim 9, wherein the request includes audio data, and wherein determining the action includes:

performing at least one of automatic speech recognition, natural language understanding, and/or speech to text analysis based on the request.

13. The method of claim 9, wherein the updated remote version includes additional metadata that is not included in the remote version, and wherein the action is based on at least a portion of the additional metadata.

14. A system, comprising:

a client computing device and a remote computing device each including at least one corresponding processor and corresponding memory storing corresponding processor-executable code, wherein the client computing device is configured to:

receive a user request for an automated assistant, executing on the client computing device, to perform an action;

in response to receiving the user request:

identify previous metadata, stored on the client device at a previous time of an immediately previous user request, wherein the previous metadata represents a previous state of the client device at the previous time;

identify current metadata, wherein the current metadata represents a current state of the client device;

generate, based on a difference between the previous metadata and the current metadata, one or more operations that, when executed, transform the previous metadata to the current metadata; and transmit, to the remote computing device, the request and the one or more operations; and wherein the remote computing device is configured to:

receive, from the client device, the request and the one or more operations; and in response to receiving the request and the one or more operations from the client device, the remote computing device is further configured to:

identify a remote version of the metadata, stored on the remote device, wherein the remote version of the metadata represents the previous state of the client computing device when the immediately previous request was received;

update the remote version of the metadata by executing the one or more operations on the remote version of the metadata;

determine, based on the request and the updated remote version, the action; and cause performance of the action.

15. The system of claim 14, wherein in causing performance of the action the remote computing device is configured to:

transmit fulfillment data to the client computing device; and wherein the client computing device is further configured to:

receive the fulfillment data, and perform the action using the fulfillment data.

16. The system of claim 14, wherein in causing performance of the action the remote computing device is configured to:

transmit fulfillment data to an additional remote computing device.

17. The system of claim 14, wherein the remote computing device is further configured to:

transmit confirmation that the remote version of the metadata was successfully updated; and wherein the client computing device is configured to:

update the previous metadata to reflect the current metadata.

18. The system of claim 14, wherein the previous metadata includes one or more indications of applications that were installed on the client device at the previous time and wherein the current metadata includes (a) an indication of an additional application that is currently installed on the client device and that is not among the applications indicated by the previous metadata and/or (b) a lack of an indication of a given application, of the applications indicated by the previous metadata, being currently installed on the client device.

19. The system of claim 14, wherein the previous metadata includes one or more indications of capabilities of the client device at the previous time and wherein the current metadata includes (a) an indication of an additional capability of the client device that differs from the capabilities indicated by the previous metadata and/or (b) a lack of an indication of a given capability, of the capabilities indicated by the previous metadata.

20. The system of claim 14, wherein the previous metadata includes one or more contacts of a user.

* * * * *